US012254489B2

(12) United States Patent
Jain

(10) Patent No.: US 12,254,489 B2
(45) Date of Patent: Mar. 18, 2025

(54) HCP CONSENT MANAGEMENT FRAMEWORK SYSTEM

(71) Applicant: Harshit Jain, Parsippany, NJ (US)

(72) Inventor: Harshit Jain, Parsippany, NJ (US)

(*) Notice: Subject to any disclaimer, the term of this patent is extended or adjusted under 35 U.S.C. 154(b) by 0 days.

(21) Appl. No.: 18/395,123

(22) Filed: Dec. 22, 2023

(65) Prior Publication Data

US 2024/0296476 A1 Sep. 5, 2024

Related U.S. Application Data

(63) Continuation-in-part of application No. 18/379,056, filed on Oct. 11, 2023, now Pat. No. 12,072,950, and a continuation-in-part of application No. 18/116,290, filed on Mar. 1, 2023, now Pat. No. 11,869,673.

(51) Int. Cl.

| | | |
|---|---|---|
| *G16H 40/20* | (2018.01) |
| *G06Q 30/018* | (2023.01) |
| *G06Q 30/0241* | (2023.01) |
| *G16H 10/60* | (2018.01) |

(52) U.S. Cl.
CPC ....... *G06Q 30/0248* (2013.01); *G06Q 30/018* (2013.01)

(58) Field of Classification Search
CPC .................. G06Q 30/0248; G06Q 30/018
See application file for complete search history.

(56) References Cited

U.S. PATENT DOCUMENTS

2013/0268357 A1* 10/2013 Heath ................ G06Q 10/10
726/26
2021/0043310 A1* 2/2021 Valuck ............... G06Q 30/018

* cited by examiner

*Primary Examiner* — Maroun P Kanaan
(74) *Attorney, Agent, or Firm* — Edmond DeFrank

(57) ABSTRACT

The embodiments disclose a publisher website consent management system including a publisher website having a graphical user interface configured to display medical product content information, a first and second publisher-partner computer wirelessly coupled to the publisher website to provide medical product content information, a first and second rules set having first and second consent form parameters coupled to the publisher website configured to generate healthcare professional consent forms, a processor coupled to the publisher website configured to generate first and second consent codes to identify the types of medical product content information that has received the HCP end user consent to be displayed on the HCP end user's digital devices, and a consent database coupled to the publisher website to store the first and second consent codes configured to filter the types of medical product content information that have received acceptance or rejection of consent from the HCP end user.

20 Claims, 12 Drawing Sheets

HCP CONSENT MANAGEMENT FRAMEWORK SYSTEM

CROSS-REFERENCE TO RELATED APPLICATIONS

This Patent Application is a Continuation-in-part and claims priority to United States Patent Application entitled: "ELECTRONIC HEALTH RECORD PLATFORM", U.S. Ser. No. 18/116,290 filed Mar. 1, 2023, by Harshit Jain, which is incorporated herein by reference.

BACKGROUND

The HCP (healthcare professional) identity landscape across geographies is a big challenge for publishers to overcome. Commercial and advertorial messaging is a highly niche segment that is strictly governed by prescribed rules, compliances, and regulations. The majority of these restrictions have been enacted by medical associations and healthcare regulatory bodies in particular nations and markets. Furthermore, the message content is governed by stringent laws. Additionally, there are stringent rules that prohibit the display of certain drugs and medical formulations to the general populace. Similarly, there are other fraudulent and non-medical compositions whose messaging is prohibited by legislation all over the world.

BRIEF SUMMARY OF THE INVENTION

The HCP Consent Management Framework 200 of FIG. 2 is an all-inclusive, end-to-end HCP consent management solution for publishers that enable publishers to consistently stay in compliance with the prescribed rules and regulations. The HCP Consent Management Framework 200 of FIG. 2 also empowers and equips these publishers to meet the challenges posed by the ever-changing data security and privacy landscape across the globe.

The HCP Consent Management Framework 200 of FIG. 2 enables publishers to collect HCP consent and manage the collected medical product content information for optimizing their advertising targeting capabilities efficiently and transparently. Thus, publishers continually adhere to the prescribed compliance norms across their respective regions or countries.

Aligning themselves with this framework, publishers are assured of staying in compliance with the data protection laws and regulations of their respective locations thereby fostering trust with the HCPs they cater to. The HCP Consent Management Framework 200 of FIG. 2 is a turnkey solution for publishers enabling them to manage HCP consent and utilize this information to derive optimal business outcomes.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of an HCP Consent Management Framework system are described for illustrative purposes and the underlying system can apply to any number and multiple types of website providers. In one embodiment of the present invention, the HCP Consent Management Framework system can be configured using consent codes. The HCP Consent Management Framework system can be configured to include an overall consent forms and can be configured to include a granular consent form using the present invention.

Message utilization poses another significant challenge for publishers. Matching and aligning the appropriate commercial message with the right HCP is a complex and time-consuming endeavor. For instance, extensive research is conducted to identify the HCPs, ensuring that an advertisement with cardiology-related medical product content information reaches an HCP specialized in cardiology rather than one specialized in a different medical field, such as dentistry or orthopedics. In the future, there will be a growing need for healthcare and life sciences marketers to access information about recent and innovative medical solutions and effectively reach the corresponding HCPs and medical practitioners on a large scale.

Publishers are also under considerable pressure to conceive, design, and establish their own customized HCP Consent Management Frameworks. This is essential for expanding HCP identities and, in turn, driving more targeted traffic to their digital advertising spaces.

Additionally, a significant volume of medical product content information, authored by experts in the medical field, is intended solely for consumption by specialist medical practitioners. In such cases, a consent management mechanism plays a pivotal role in restricting public access to this medical product content information. Moreover, publishers may limit access to detailed medical product content information on their websites exclusively to pre-identified HCPs, often tailoring the experience for HCPs who visit specific sections or pages.

Figure 1:
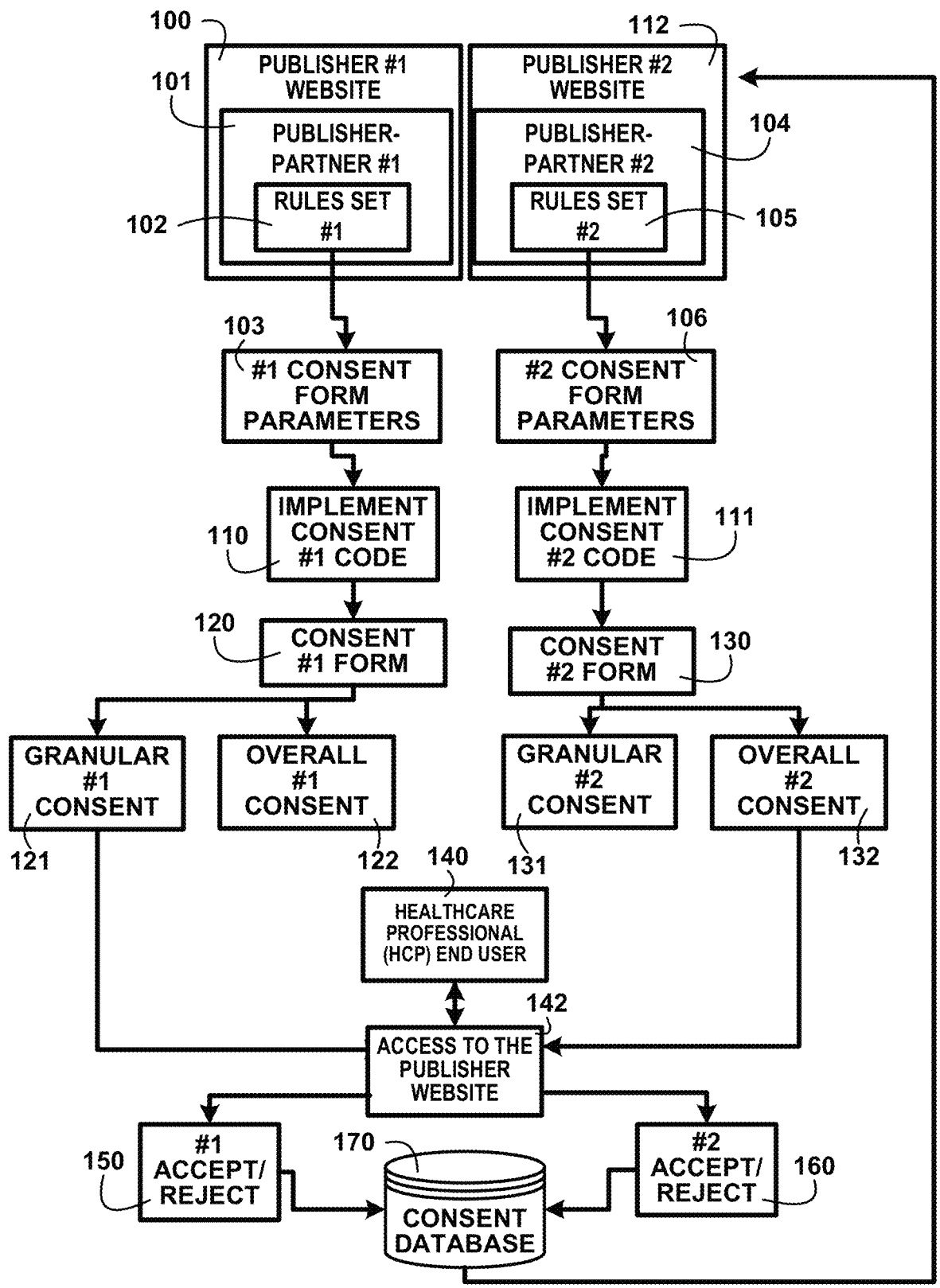
FIG. 1 shows for illustrative purposes only an example of the publisher website consent management of one embodiment.

FIG. 1 shows for illustrative purposes only an example of a publisher website consent management of one embodiment. FIG. 1 shows a publisher #1 website 100 having a publisher-partner #1 101 selecting rules set #1 102 and #1 consent form parameters 103. The publisher #2 website 112 has a publisher-partner #2 104 selecting rules set #2 105 with #2 consent form parameters 106. Each publisher-partner provides consent form parameters based on their website medical product content information and geographical compliance requirements. In one embodiment the #1 consent form parameters 103 are converted into code to implement consent #1 code 110. The consent code is converted in at least one consent #1 form 120. For example, consent #1 form 120 is converted into an overall #1 consent 122 to cover all medical product content information of the publisher-partner #1 101. In addition, consent #1 form 120 is converted into multiple granular #1 consent 121 forms. Each granular #1 consent 121 form covers specific aspects of the publisher-partner #1 101 medical product content information.

Figure 2:
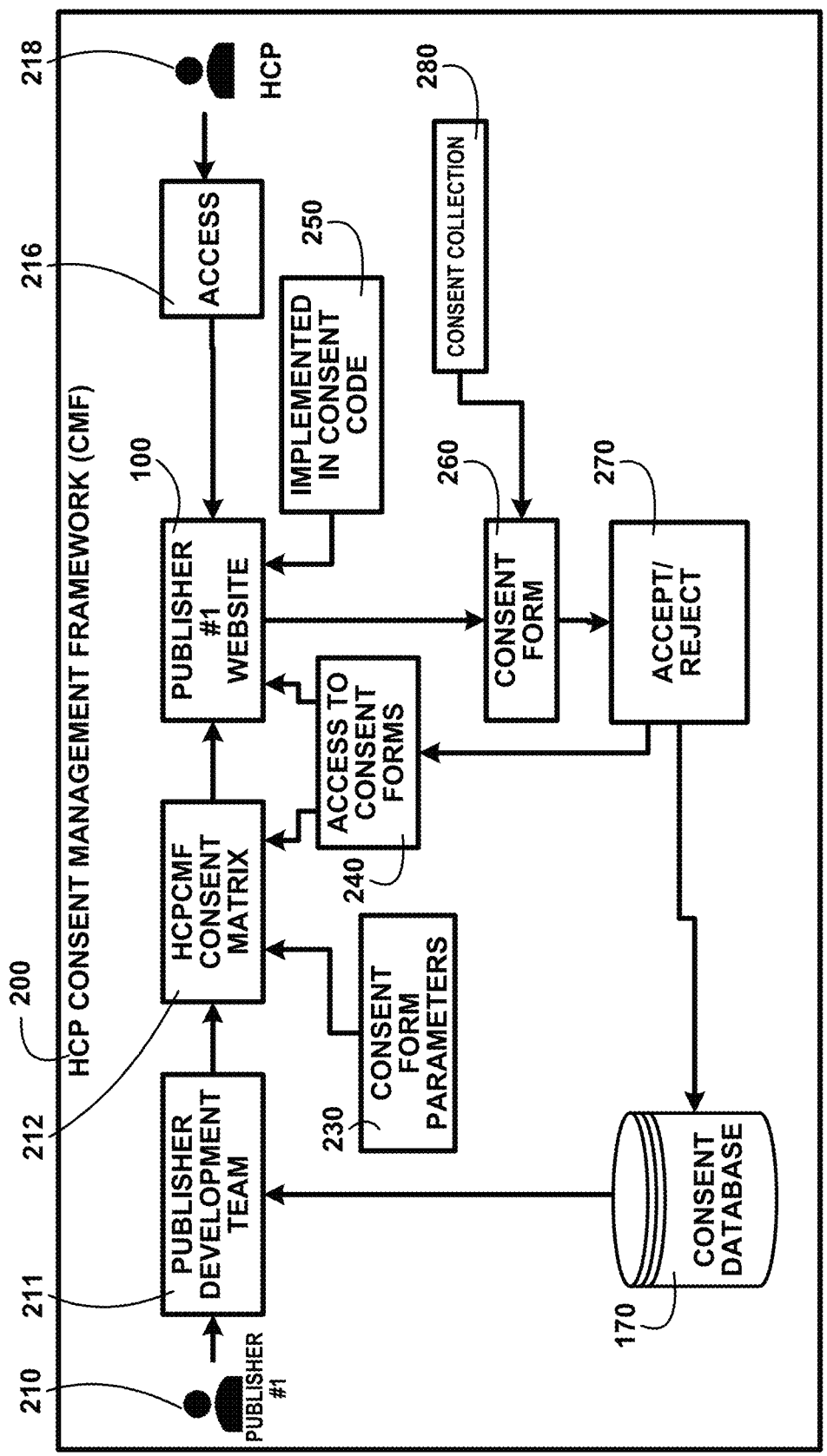
FIG. 2 shows for illustrative purposes only an example of the HCP Consent Management Framework of one embodiment.

As discussed in U.S. application Ser. No. 18/116,290, which is incorporated by reference herein, the medical products graphical user interface is configured to display medical product content information 122 on electronic health records medical provider and patient interaction segment screens during an appointment. A healthcare professional (HCP) end user 140 may only consent to medical product content information or another offering listed on the granular #1 consent 121 form. The healthcare professional (HCP) end user 140 will receive the consent forms upon access to the publisher's website 142. The HCP 218 of FIG. 2 may #1 accept/reject 150 one or more consent forms. The election by the HCP 218 of FIG. 2 is recorded on the consent database 170 of the publisher #1 website 100. In this example, the HCP 218 of FIG. 2 has elected one of the granular #1 consent 121 form selections.

In another embodiment, the #2 consent form parameters 106 are converted into implement consent #2 code 111. At least one consent #2 form 130 into a granular #2 consent 131 and an overall #2 consent 132 form. The HCP upon access to the publisher website 142 selects the overall #2 consent 132 form and responds to the #2 accept/reject 160 accept. The accepted overall #2 consent 132 form is recorded in the consent database 170 of the publisher #1 website 100 of one embodiment. Message utilization is another great challenge that publishers need to address on their end. It is a massive and time-consuming endeavor for publishers to just match and map the suitable commercial message with the correct HCP 218 of FIG. 2. For example, much research goes into HCP 218 of FIG. 2 identification so that an advertisement with a context related to cardiology reaches an HCP 218 of FIG. 2 who specializes in cardiology rather than reaching an HCP 218 of FIG. 2 who specializes in another medical specialty, for example dentistry or orthopedics.

There is a requirement for marketers in the healthcare and life sciences domain to get information about recent and innovative medical solutions to reach the corresponding HCPs and medical practitioners at the earliest and with the best possible means to reach HCPs and that too at scale.

There is a high demand on the publisher 210 of FIG. 2 side to conceptualize, design, and develop their bespoke HCP 218 of FIG. 2 Consent Management Frameworks to scale HCP 218 of FIG. 2 identities and thereby drive more targeted traffic to their respective digital advertisement spaces.

Moreover, there is a growing body of medical product content information that is created by experts in the medical field and is meant to be consumed by none other than specialist medical practitioners. In such a scenario, a consent management mechanism plays a significant role in preventing the general public from accessing such medical product content information. Furthermore, publishers may restrict access to granular medical product content information on their websites only to previously identified HCPs, to the point of generating custom-made experiences for HCPs landing on particular sections or pages.

DETAILED DESCRIPTION

FIG. 2 shows for illustrative purposes only an example of the HCP Consent Management Framework (CMF) 200 of one embodiment. FIG. 2 shows an HCP Consent Management Framework 200 to collect consent from HCP 218 users of a publisher #1 website 100. The Publisher 210 has a publisher development team 211 to establish an HCPCMF consent matrix 212 on the publisher #1 website 100. Access 216 from an HCP 218 is authenticated referencing consents granted by the HCP 218 stored in the consent database 170. No consent recorded, triggers consent form parameters 230 implemented in consent code 250 in the form of access to consent forms 240 converted into one or more consent forms 260. Consent forms refers to medical product content information that can be accessed by the HCP based on the explicit consent they have provided to the Publisher on a specific website. The HCP 218 user may accept/reject 270 from a selection of consent forms and add the HCP 218 selection into the consent collection 280 of one embodiment.

The HCP Consent Management Framework 200 promotes the concept of consent granularity, ensuring that healthcare professionals (HCPs) have the autonomy to select the specific types of data processing and online marketers with whom they are willing to share their data. This level of granularity empowers HCPs to exercise greater control over the data they provide to publishers. Once consent is obtained, the data is processed by the HCPs' agreed-upon terms.

HCPs may be required to provide consent for various activities, which can vary among different publishers based on their unique business needs. The list of activities for which HCP 218 consent is required is presented to the HCP 218 in a digital format, often as a pop-up window when they visit the publisher's website. The consent form is designed to be clear and straightforward, ensuring that HCPs can easily understand and provide their consent.

The said form would mention the activities for which explicit consent is being sought and the language used in the form would be straightforward for the HCP 218 to understand.

The HCP Permission Management Framework provides the publishers with a template for developing and specifying the portions of the consent form they wish to display to the HCPs. The form design template also allows the publishers to include their consent statements. The template will also enable publishers to develop a consent form that is not only concise but also simple enough for HCPs to easily understand and grant their approval accordingly.

Activities for which consent is being sought are presented as a list of items with a corresponding checkbox for each of the listed activities that the HCP 218 can tick/select. The goal is to offer the information to the HCP 218 in such a way that they can freely select required statements or settings expressing their permission for the selected information to be processed and used by the publisher 210 to conduct the indicated activities.

The HCP Permission Management Framework's design and development both promote end-user rights because the consent form does not provide pre-selected options to the user or a mechanism by which publishers can create a form in which inactivity of the HCP 218 is in any way considered consent. In doing so, the publisher 210 never violates any authorized data processing provisions of regulatory frameworks, which solely considers willfully granted consent.

Additionally, publishers may easily show this consent form, as valid documentary proof or evidence, to the data regulatory authorities of their various regions that the consent was obtained voluntarily and without any compulsion or using any unfair means, from the concerned HCPs.

Based on the content that is taken from HCPs, the corresponding publishers would then apply the consent to the entire website (site-level consent ramifications); or the consent would be applied at the web page level (HCPs can be provided or denied access to certain pages of the website based on the received HCP 218 content), or the consent could be enforced for certain sections of the website's page (for example, a section dedicated to a content snippet meant for cutting edge research in oncology would not be exposed to an HCP 218 that is a specialist in dermatology or say nephrology) based on the attributes shared by the concerned HCP 218.

Figure 3:
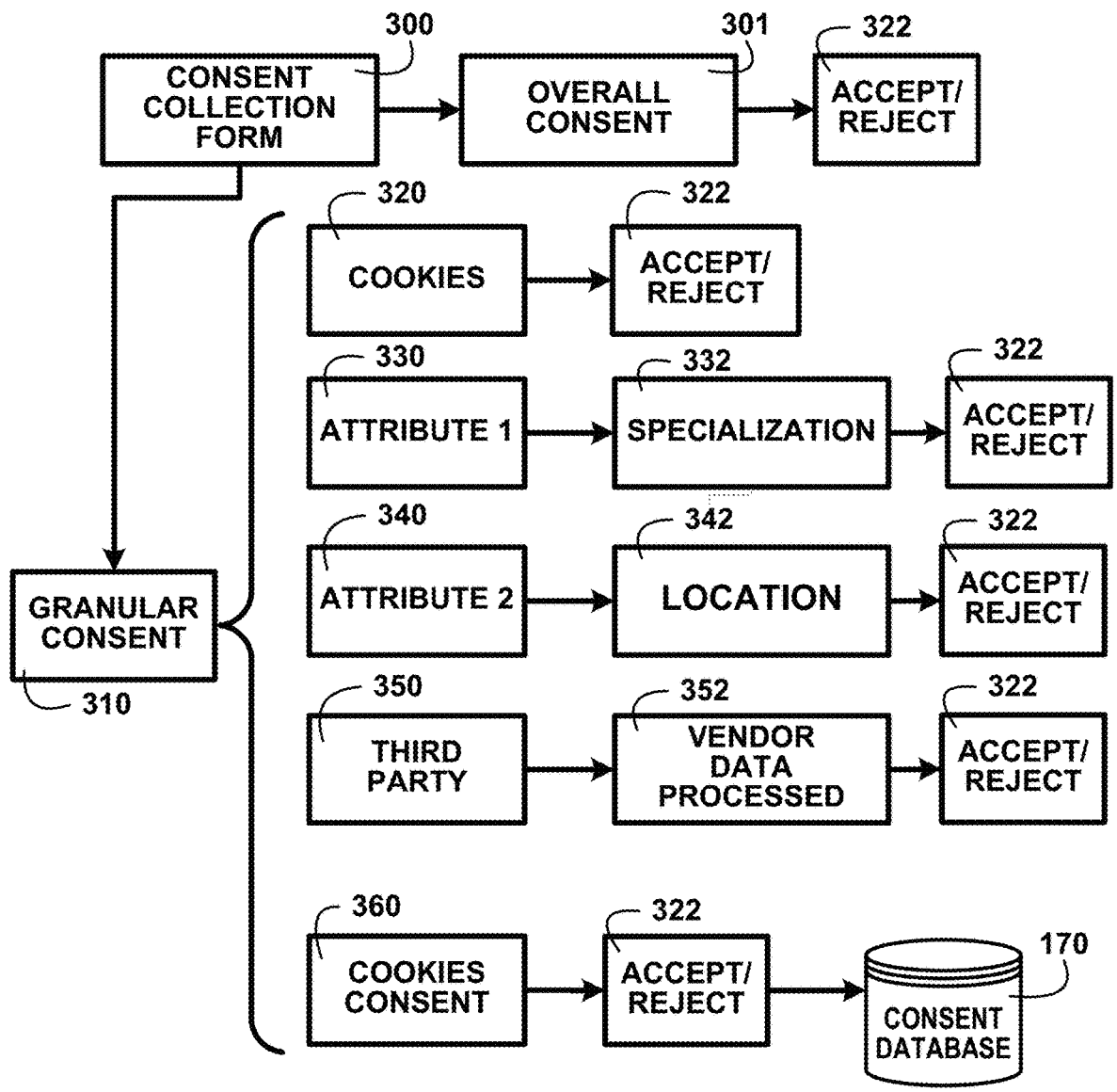
FIG. 3 shows for illustrative purposes only an example of a consent collection form of one embodiment.

Consent Collection Form:

FIG. 3 shows for illustrative purposes only an example of a consent collection form of one embodiment. FIG. 3 shows an example of a consent collection form 300 content. In one example an overall consent 301 the HCP 218 of FIG. 2 user may accept/reject 322. Another example is a selection of granular consent 310 forms. In one embodiment, the granular consent 310 form may include cookies 320 that display using a graphical user interface (GUI) to list what medical product content information the cookie form includes that the HCP 218 of FIG. 2 user may accept or reject 322. Other examples of a granular consent 310 form include attribute 1 330 of the HCP 218 of FIG. 2 user being specialization 332 to accept/reject 322. Another attribute 2 340 may include a geographical location 342 to accept/reject 322. medical product content information consent varies by geographical location and the granular consent 310 form will include specific content consents based on geographical compliance regulations. Another issue is third-party 350 content and the manner the vendor data processed 352 for display. The HCP 218 of FIG. 2 may accept/reject 322 based on location compliance restrictions. Cookies consent 320 is subject to acceptance based on the medical product content information of the cookie displayed to select accept/reject 322 responses. Any of the consent responses received is stored in the consent database 170 of one embodiment.

The HCP Consent Management Framework 200 of FIG. 2 would store/document consent details of the HCPs for the respective publisher 210 of FIG. 2 within a consent database. The consent collected from the HCPs would also be accompanied by the corresponding attributes they share, for example, specialization, location, etc. Moreover, the attributes collected from the HCPs are configurable, which means that the HCPs can freely select the specific consent they want to provide and would subsequently be used for the stated data processing and for receiving messages and medical product content information accordingly.

The HCPs would be asked to provide specific attributes around their nature of work, that is, with which medical specialty they are aligned. They could also be asked to provide information about their location or specifically the location of their workplace, that is, where the hospital, clinic, or healthcare facility they are associated with is located. The HCP 218 of FIG. 2 could also be asked to provide consent for any specific academic objective that they would like to pursue or any specific publication they would like to subscribe to.

These attributes would vary from one publisher 210 of FIG. 2 to another and even differ from one country to another within a specific geographically demarcated market. Nonetheless, the publishers would only seek the information from the HCPs that is legal within their specific market/country/location. In doing so, publishers do not infringe on any compliance parameters and adhere to the prescribed medical and legal injunctions of their respective regions or countries.

Figure 4:
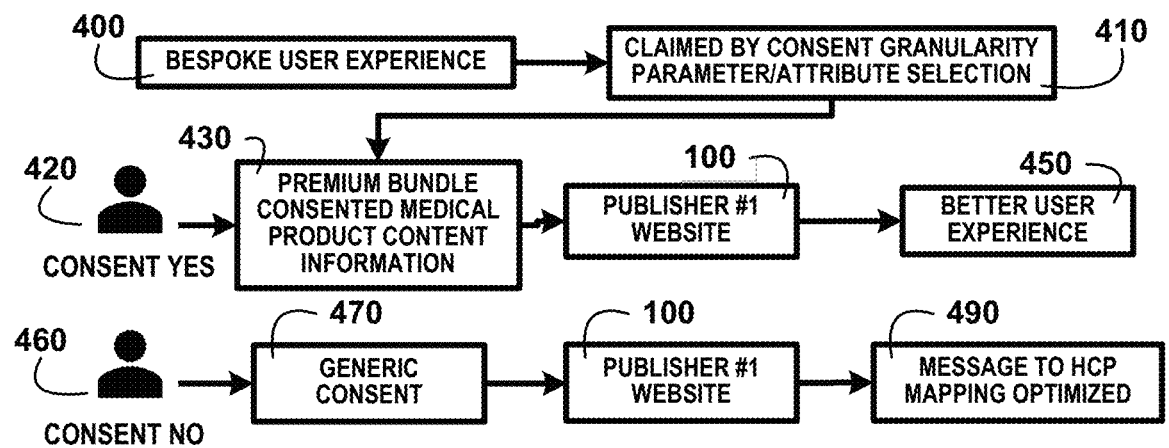
FIG. 4 shows for illustrative purposes only an example of a bespoke user experience of one embodiment.

Bespoke User Experience:

FIG. 4 shows for illustrative purposes only an example of a bespoke user experience of one embodiment. FIG. 4 shows bespoke user experience 400 claimed by consent granularity parameter/attribute selection 410. An HCP 218 of FIG. 2 consent yes 420 response to a premium bundle of consented medical product content information 430 for the publisher #1 website 100 creates a better user experience 450 by consenting to all publisher medical product content information. An HCP 218 of FIG. 2 consent no 460 response to a generic consent 470 publisher #1 website 100 generates a message to HCP 218 of FIG. 2 mapping optimized 490 to avoid consent-required medical product content information of one embodiment.

Based on the consent provided by consenting to all publisher medical product content information or only HCP selected portions of the publisher medical product content information, an HCP can be shown or debarred from accessing medical product content information on a specific website. This means HCPs excelling in a particular healthcare domain get to see medical product content information associated with their specific areas of expertise only and not just any other generic medical product content information. For HCPs who do not provide explicit consent, the website though providing them access to the generic medical product content information would restrict such users from accessing specific premium medical product content information present and available on the site. This means the consent provided by the HCP 218 of FIG. 2 would determine what type of medical product content information or message they would get to see on the publisher's website.

Figure 5:
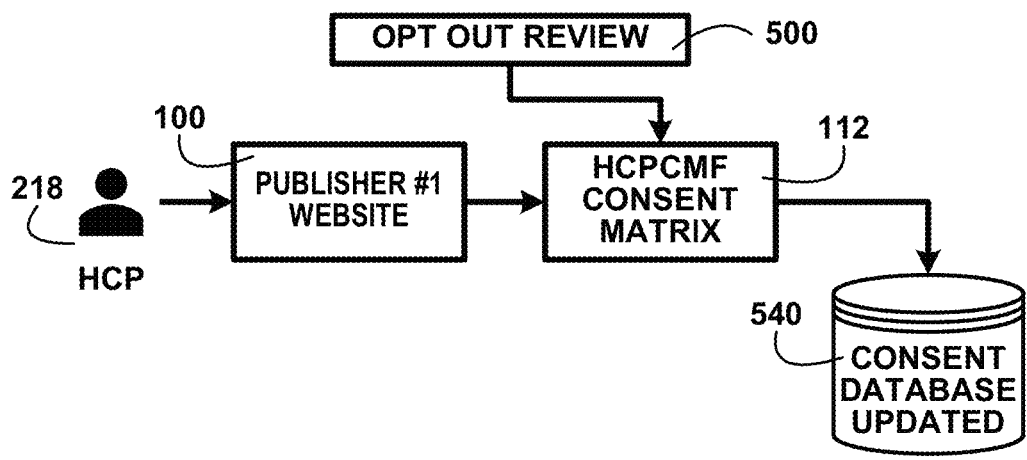
FIG. 5 shows for illustrative purposes only an example of an opt-out review of one embodiment.

Opt-Out Review:

FIG. 5 shows for illustrative purposes only an example of an opt-out review of one embodiment. FIG. 5 shows an opt-out review 500 of an HCP 218 publisher website 100 selection. The HCPCMF consent matrix 212 records the opt-out response with a consent database updated 540.

Opt-Out Management: The HCP Consent Management Framework 200 of FIG. 2 allows HCPs to withdraw their consent whenever they see fit, respecting the rights of data subjects, i.e., the HCPs. The option to opt out is a fundamental aspect of data subject rights and is a standard practice mandated by privacy regulatory authorities worldwide of one embodiment.

Figure 6:
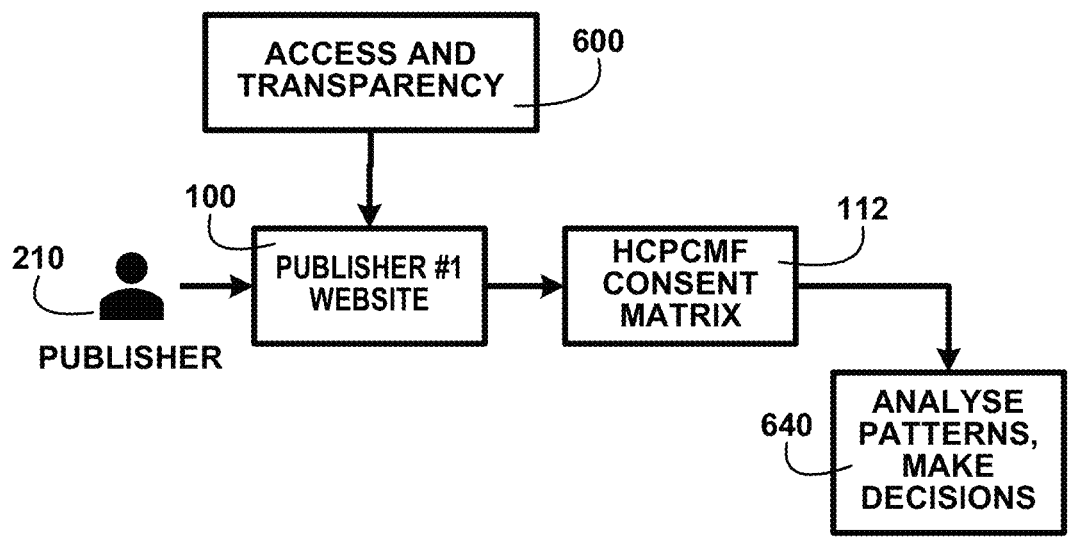
FIG. 6 shows for illustrative purposes only an example of access and transparency of one embodiment.

Access and Transparency:

FIG. 6 shows for illustrative purposes only an example of access and transparency of one embodiment. FIG. 6 shows access and transparency 600 from a publisher 210 on the publisher #1 website 100. Further, as discussed in U.S. application Ser. No. 18/116,290, incorporated above, a medical products provider computer 110 of FIG. 1 stored the medical product content information and graphical displays on network platform databases and memory devices 132 coupled to network platform servers, communication devices, processors, graphic devices and other digital devices 130. The HCPCMF consent matrix 212 uses a platform having a plurality of servers and processors to analyze patterns and make decisions 640 related to HCP 218 of FIG. 2 user privacy and consent matters of one embodiment. HCPs are asked to provide specific attributes related to their professional background, including their medical specialty, workplace location, academic objectives, or publication preferences. The specific attributes may vary between publishers and even from one country to another within a geographically segmented market. Importantly, publishers only request information that is legally permissible in their specific market or country, ensuring compliance with medical and legal regulations.

The HCP Consent Management Framework 200 of FIG. 2 offers easy access for publishers, providing them with a dashboard to review their HCP 218 of FIG. 2 consent-related data. This facilitates a deeper understanding of consent data, enabling publishers to derive valuable insights and make informed business decisions. The HCP Consent Management Framework 200 of FIG. 2 is easy to access, and publishers can seamlessly review their respective HCP 218 of FIG. 2 consent-related data. For a better understanding of the consent data, to derive apt business acumen from consent data, and to make informed business decisions, publishers are provided with a dashboard.

Figure 7:
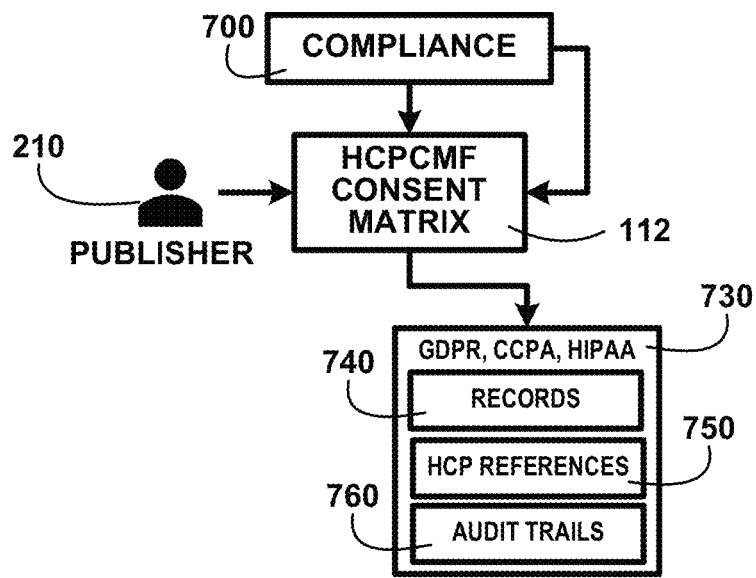
FIG. 7 shows for illustrative purposes only an example of compliance of one embodiment.

Compliance:

FIG. 7 shows for illustrative purposes only an example of compliance of one embodiment. FIG. 7 shows compliance 700 by the publisher 210 using the HCPCMF consent matrix 212 to meet regulatory compliance with at least GDPR, CCPA, and HIPAA 730. Where in the compliance agencies include at least GDPR (General Data Protection Regulation), CCPA (California Consumer Privacy Act) and HIPAA (Health Insurance Portability and Accountability Act) are some of the popular and cited regulatory frameworks, that govern data privacy and data protection procedures and process in the EU (European Union) region and the US, respectively.

The consent database 170 of FIG. 1 includes consent form records 740, HCP references 750, and audit trails 760 to verify to any compliance agency that the publisher 210 and publisher #1 website 100 of FIG. 1 are in compliance of one embodiment.

AdTech organizations, for example advertisers or publishers operate in a complex legal framework, with national laws, medical laws, and restrictions imposing strict data processing obligations. The HCP Consent Management Framework 200 of FIG. 2 aids publishers in remaining compliant with these rules and regulations at all times. Compliance needs are met within the framework by transparently maintaining HCP 218 of FIG. 2 consent records, managing consent preferences, and giving audit trails to publishers. All of this enables publishers to give verifiable evidence of compliance to data compliance authorities in their specific geography.

Based on the content taken from HCPs, publishers can apply consent at different levels. This includes applying consent at the site level, web page level, or for specific sections of a webpage, depending on the attributes shared by the HCPs.

The HCP Consent Management Framework 200 of FIG. 2 ensures bespoke user experiences. HCPs are shown medical product content information related to their specific areas of expertise based on their consent. Those who do not provide explicit consent can access generic medical product content information but are restricted from accessing premium medical product content information.

The framework also prioritizes managing opt-outs, allowing HCPs to withdraw their consent as needed. This is vital for respecting the rights of data subjects, and the HCPs, and aligns with privacy regulations globally.

Respecting user rights is a core principle of the HCP Consent Management Framework 200 of FIG. 2. HCPs can change their consent preferences or withdraw consent without any hindrance. When an HCP 218 of FIG. 2 opts out or withdraws consent, the publisher 210 of FIG. 2 ceases to process their data, ensuring full compliance with data subject rights and privacy regulations.

The HCP Consent Management Framework 200 of FIG. 2 has been designed such that the rights of data subjects, that is, HCPs, are upheld both by design and by development. HCPs can withdraw their consent and even change their consent preferences as and when they require it, and they can do so without any prior obligation or hindrance. Once an HCP 218 of FIG. 2 has opted out or withdrawn their consent from a website, the concerned publisher 210 of FIG. 2 stops processing the data of that particular HCP 218 of FIG. 2.

Figure 8:
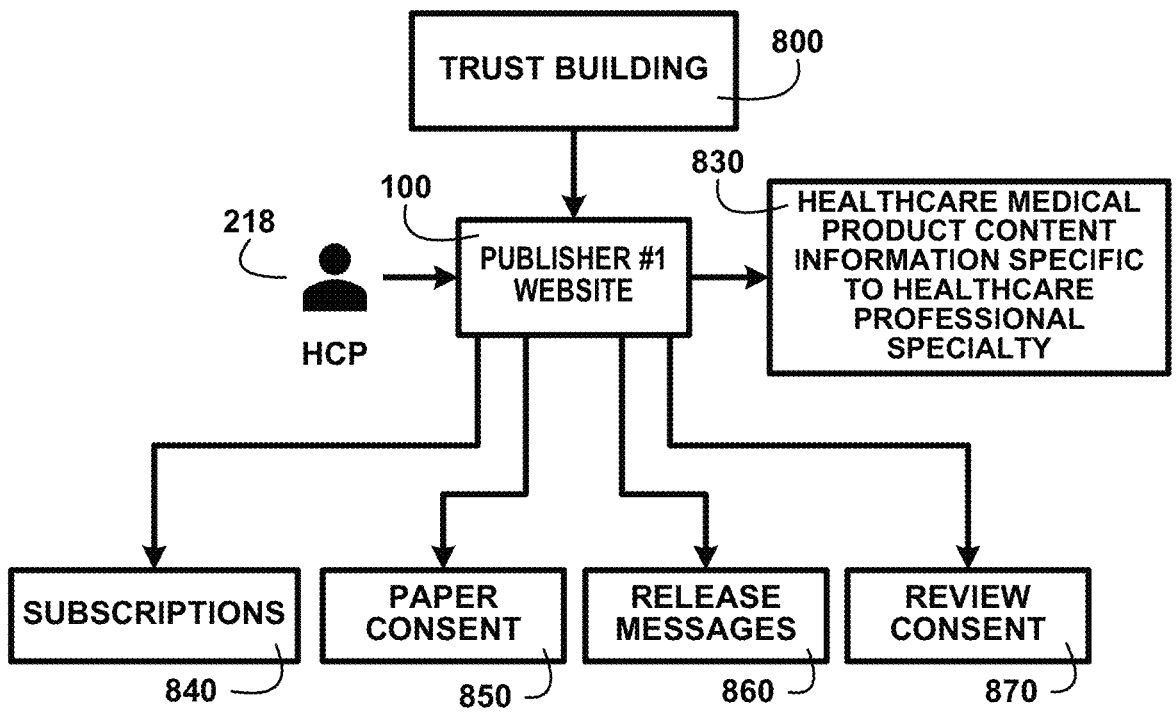
FIG. 8 shows for illustrative purposes only an example of trust building of one embodiment.

Trust Building:

FIG. 8 shows for illustrative purposes only an example of trust building of one embodiment. FIG. 8 shows trust building 800 between the HCP 218 and publisher #1 website 100 that provides healthcare medical product content information specific to healthcare professional specialty 830. The HCP 218 subscriptions 840 allow for paper consent 850 for relevant advertisements and medical product content information, information release messages 860 including commercial messages, and review consent 870 of medical publications and research papers by the HCP 218 of one embodiment.

The HCP Consent Management Framework 200 of FIG. 2 enables publishers to create trust with the HCPs they serve through their websites. This is accomplished through HCP 218-focused consent. This means that end users can only access healthcare-related material after providing explicit agreement that they are in the healthcare or life sciences domain.

Furthermore, by using consent granularity, publishers can offer HCPs messages that are specifically tailored to their needs. When HCPs are fully aware that they control their consent preferences and how their consent data is used by publishers who are providing them with relevant advertisements, commercial messages, and content, they are more likely to interact with these messages and niche content (specific medical publications, research papers, subscription requests to medical journals, etc.) favorably.

Figure 9:
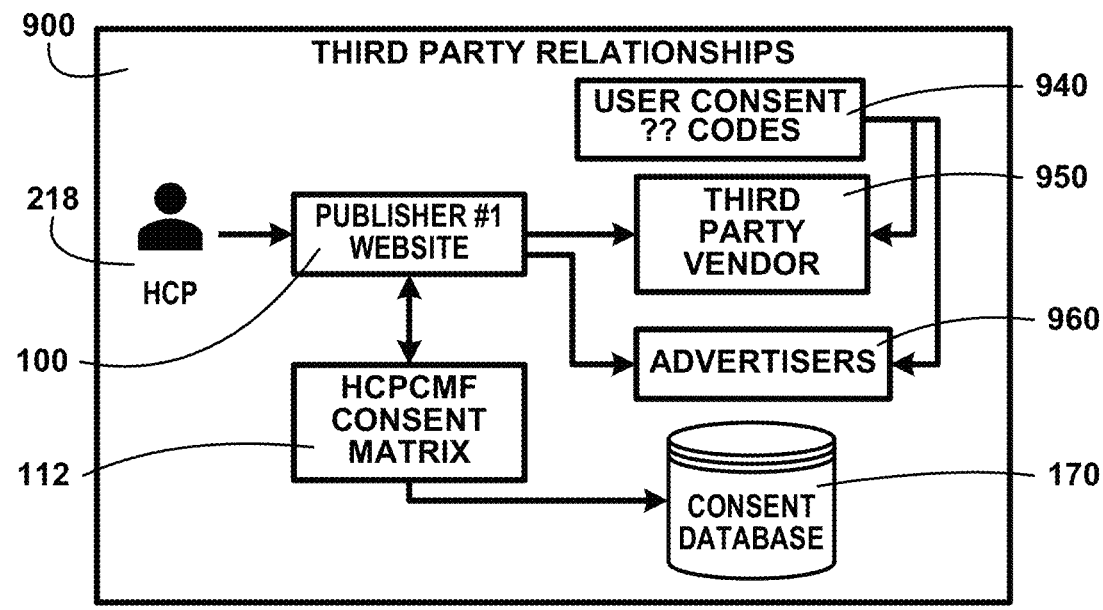
FIG. 9 shows a block diagram of an overview of third-party relationships of one embodiment.

Third-Party Relationships:

FIG. 9 shows a block diagram of an overview of third-party relationships of one embodiment. FIG. 9 shows building trust based third-party relationships 900 with the HCP 218 and publisher #1 website 100. The HCPCMF consent matrix 212 user consent codes 940 generate consent forms for the third-party vendor 950 and advertisers 960 to seek consent from their users to maintain regulatory compliance.

Whenever HCPs provide their consent, these consented parameters, within the HCP CMF are automatically generated into what is known as 'User Consent Codes' that the respective Publishers can share with third-party entities, further building the trust/relationship between the concerned Publisher with their respective third-party relations, that is, vendors. Thus HCP CMF enables Publishers within the Ad Tech space to expand their scope of third-party relations, based on transparency, compliance, and thereby augment their trustworthiness in the business domain/industry.

The HCPCMF consent matrix 212 also stores the HCP 218 consent form responses on the consent database 170 of one embodiment.

To meet specific criteria, publishers frequently must collaborate with third-party suppliers and vendors. The HCP Consent Management Framework 200 of FIG. 2 also supports ensuring that HCP 218 consent is applied to these third parties, as well as that those business organizations adhere to the specified privacy and data protection rules. For example, if an HCP 218 withdraws its consent, the consequences are applied to any third party with whom the publisher 210 of FIG. 2 shared HCP 218 data. Furthermore, processing of HCP 218 data ceases immediately in such a circumstance, and neither the publisher 210 of FIG. 2 nor any of their third-party vendors or data processors can thereafter process that HCP's data.

Figure 10:
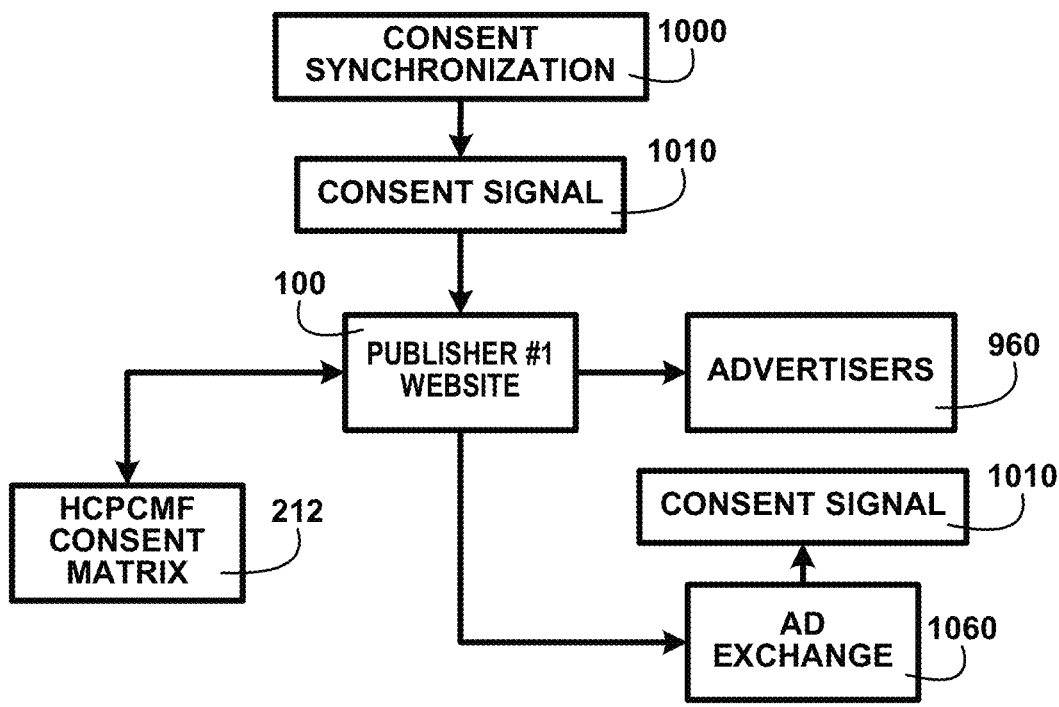
FIG. 10 shows for illustrative purposes only an example of consent synchronization of one embodiment.

Consent Synchronization:

FIG. 10 shows for illustrative purposes only an example of consent synchronization of one embodiment. FIG. 10 shows consent synchronization 1000 using a consent signal 1010 when an HCP 218 of FIG. 2 user accesses the publisher #1 website 100. The HCPCMF consent matrix 212 sends through the wireless communications the consent signal 1010 to advertisers 960 and an advertisement exchange 1060 to determine if advertising medical product content information is within compliance and covered by HCP 218 of FIG. 2 user consent of one embodiment.

The HCP Consent Management Framework 200 of FIG. 2 supports the synchronization of permission signals between publishers, advertisers, and ad exchanges to assure compliance. This is also the more crucial advertisement delivery in a programmatic advertising ecosystem where advertising impressions and placement of these ads take place in the blink of an eye.

Figure 11:
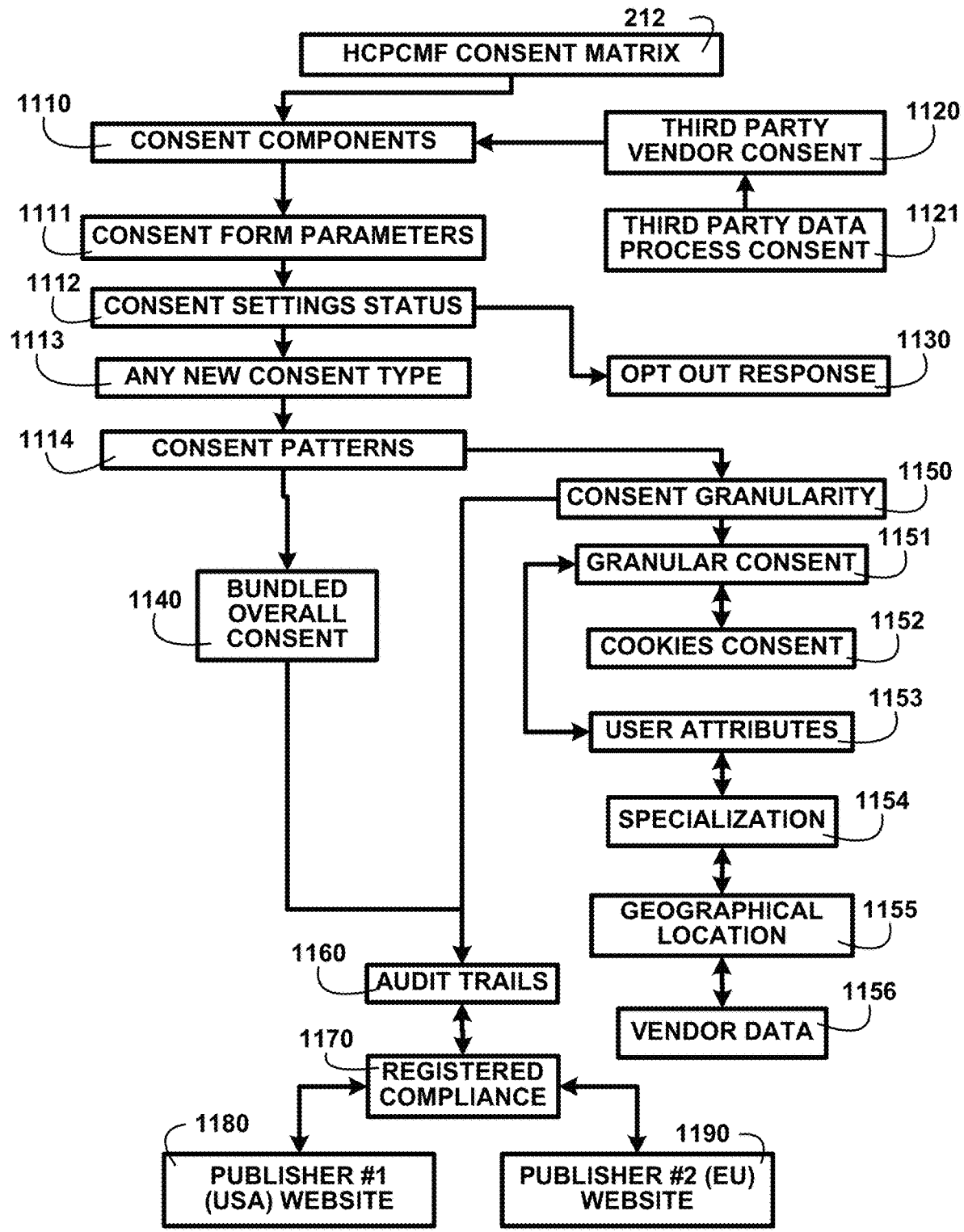
FIG. 11 shows a block diagram of an overview of the consent matrix of one embodiment.

Consent Matrix:

FIG. 11 shows a block diagram of an overview of the consent matrix of one embodiment. FIG. 11 shows the HCPCMF consent matrix 212 consent components 1110. The consent components 1110 include third-party vendor consent 1120 selection for third-party data process consent 1121. The consent components 1110 include consent form parameters 1111 and consent settings status 1112.

The consent settings status 1112 may show an HCP 218 of FIG. 2 opt-out response 1130. The consent component 1110 includes any new consent type 1113, for example, that was published by a regulatory agency. The consent components 1110 include consent patterns 1114. In one embodiment a consent pattern 1114 may include a bundled overall consent 1140 wherein the HCP 218 of FIG. 2 user accepts all medical product content information. In another embodiment, consent patterns 1114 provide consent granularity 1150 wherein a granular consent 1151 form may include cookies consent 1152 and specific user attributes 1153.

In one embodiment user attributes 1153 include specialization 1154, geographical location 1155, and vendor data 1156. The HCPCMF consent matrix 212 maintains consent audit trails 1160 for registered compliance 1170. Different geographical locations have differing compliance regulations. However, the HCPCMF consent matrix 212 maintains consent audit trails 1160, for example, a publisher 1 (USA) website 1180 and a publisher 2 (EU) website 1190 of one embodiment.

The HCP Consent Management Framework 200 of FIG. 2 provides a one-stop destination for publishers where they can manage all of their HCP 218 of FIG. 2 consent-related components and that too form a single consent management repository and dashboard. Publishers can access the framework to review their current consent settings, which they are offering to their respective HCPs, review these consent-related choices that they offer, and make required changes to these choices as per their specific needs.

Figure 12:
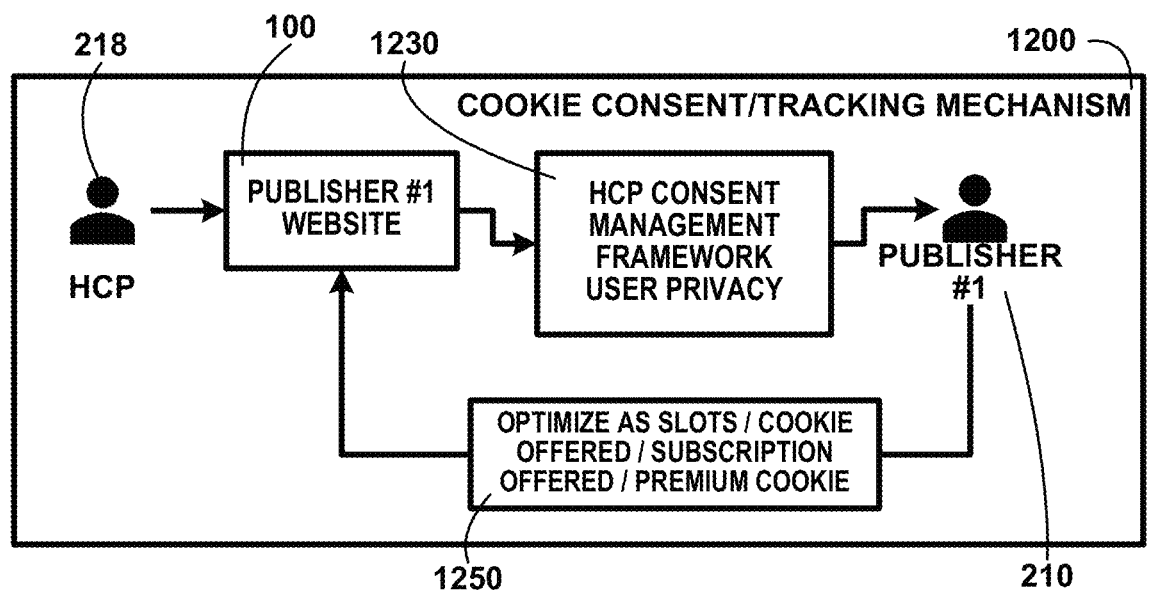
FIG. 12 shows for illustrative purposes only an example of the cookie consent/tracking mechanism of one embodiment.

Cookie Consent/Tracking Mechanism:

FIG. 12 shows for illustrative purposes only an example of the cookie consent/tracking mechanism of one embodiment. FIG. 12 shows a cookie consent/tracking mechanism 1200. The cookie consent/tracking mechanism 1200 maintains vigilant HCP 218 privacy on a publisher #1 website 100. HCP Consent Management Framework user privacy 1230 is a main concern of the publisher 210. The HCP Consent Management Framework user privacy 1230 uses the platform to optimize ad slots/cookie offered/subscription offered/premium cookie 1250 of one embodiment.

Cookie Consent Management: If cookies or similar tracking mechanisms are used for profiling end-users and sending messages and advertisements based on collected information, publishers must obtain consent from HCPs and transparently explain the tracking purposes to them.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. A unique HCP user identity system, comprising:
   an identity solution database configured for collecting end-user healthcare professional (HCP) digital device action signals;
   an identity resolution server coupled to the identity solution database configured to collate the client-side end-user HCP digital device action signals;
   an analyzer coupled to the identity resolution server configured for performing data targets/analytics of the end user HCP digital device actions signals;
   a first processor coupled to the identity solution database configured to create a non-conflicting client-side unique user identity without personal identifiable information of the client-side end-user by hashing behavioral patterns of multiple session and browser attributes including browser details, page reference, and timestamp, combined with generated random tokens;
   a second processor coupled to the identity resolution server configured for performing data targets/analytics of the end user HCP digital device actions signals and further configured to identify behavioral patterns based on browser attributes of the end user HCP digital device actions signals;
   wherein the first processor generates and assigns a unique user identity (UUID) to the identified HCP, the HCP identified behavioral patterns, and existing HCP consent forms and future consent forms; and
   wherein the identity resolution server is further configured to provide the hashed behavioral patterns data to advertiser partners for the newly determined advertising targeting-related data within commercial advertisement content information messages based on the specialty of the identified HCP.

2. The unique HCP user identity system of claim 1, further comprising identified HCP browser attributes deterministic signals include subscriptions/associations, HCP consent, demographic signals, age, gender, and geographical location.

3. The unique HCP user identity system of claim 1, further comprising identified HCP browser attributes probabilistic signals including browsing history, visit frequency, and search keywords.

4. The unique HCP user identity system of claim 1, further comprising the end user HCP collected data includes browser attributes including the name of the browser, operating system OS used by the device, device brand, device model version, and session timestamp.

5. The unique HCP user identity system of claim 1, further comprising the identity solution combines all identity signals for an HCP including deterministic persistent data and probabilistic non-persistent data.

6. The unique HCP user identity system of claim 1, further comprising the end user HCP collected data includes additional signals including probabilistic signals of advertiser ID, universal ID, and non-persistent data.

7. The unique HCP user identity system of claim 1, further comprising the end user HCP collected data includes additional signals including deterministic signals of email ID, mobile number, and persistent data.

8. The unique HCP user identity system of claim 1, further comprising HCP attributes updates including online/offline actions that include new attributes, new email ID, new location, new browser, and new device.

9. The unique HCP user identity system of claim 1, further comprising HCP attributes updates of identity signals old/new of the HCP is used to maintain an updated identity database, and updated conflict resolution for the HCP identified by the UUID.

10. A unique HCP user identity system, comprising:
an identity solution database configured for collecting end-user healthcare professional (HCP) digital device action signals;
an identity resolution server coupled to the identity solution database configured to collate the client-side end-user HCP digital device action signals;
an analyzer coupled to the identity resolution server configured for performing data targets/analytics of the end user HCP digital device actions signals;
a first processor coupled to the identity solution database configured to create a non-conflicting client-side unique user identity without personal identifiable information of the client-side end-user by hashing behavioral patterns of multiple session and browser attributes including browser details, page reference, and timestamp, combined with generated random tokens;
a second processor coupled to the identity resolution server configured for performing data targets/analytics of the end user HCP digital device actions signals and further configured to identify behavioral patterns based on browser attributes of the end user HCP digital device actions signals;
wherein the first processor generates and assigns a unique user identity (UUID) to the identified HCP, the HCP-identified behavioral patterns, and existing HCP consent forms and future consent forms;
wherein the identity solution database is further configured for collecting HCP digital device action signals with cross-device tracking of HCP multiple devices used during the workday in searching for relevant data and information; and
wherein the identity resolution server is further configured to provide the behavioral patterns data to advertiser partners for the newly determined ad advertising targeting-related data within commercial advertisement content information messages based on the specialty of the identified HCP.

11. The unique HCP user identity system of claim 10, further comprising identified HCP browser attributes deterministic signals include subscriptions/associations, HCP consent, demographic signals, age, gender, and geographical location.

12. The unique HCP user identity system of claim 10, further comprising at least one healthcare professional consent form stored in the consent database configured to convey overall, granular consent for at least one of a group of healthcare professional attributes including specialization, geographical location, third-party vendor data, or cookies consent, wherein the healthcare professional may select the type of consent to accept and may reject all of the types of consent.

13. The unique HCP user identity system of claim 10, further comprising the end user HCP collected data includes browser attributes including the name of the browser, operating system OS used by the device, device brand, device model version, and session timestamp.

14. The unique HCP user identity system of claim 10, further comprising the identity solution combines all identity signals for an HCP including deterministic persistent data and probabilistic non-persistent data.

15. A unique HCP user identity system, comprising:
an identity solution database configured for collecting end-user healthcare professional (HCP) digital device action signals;
wherein collecting end-user HCP digital device actions signals of non-personal identified information picked in compliance with regional privacy regulations;
an identity resolution server coupled to the identity solution database configured to collate the client-side end-user HCP digital device action signals;
a first processor coupled to the identity solution database configured to create a non-conflicting client-side unique user identity without personal identifiable information of the client-side end-user by hashing behavioral patterns of multiple session and browser attributes including browser details, page reference, and timestamp, combined with generated random tokens;
an analyzer coupled to the identity resolution server configured for performing data targets/analytics of the end user HCP digital device actions signals;
a second processor coupled to the identity resolution server configured for performing data targets/analytics of the end user HCP digital device actions signals;
wherein the second processor coupled to the identity resolution server is further configured to identify behavioral patterns based on browser attributes of the end user HCP digital device actions signals;
wherein the first processor generates and assigns a unique user identity (UUID) to the identified HCP, the HCP-identified behavioral patterns, and existing HCP consent forms and future consent forms;
wherein the identity solution database is further configured for collecting HCP digital device action signals with cross-device tracking of HCP multiple devices used during the workday in searching for relevant data and information; and wherein the identity resolution server is further configured to provide the behavioral patterns data to advertiser partners for the newly determined advertising targeting-related data within commercial advertisement content information messages based on the specialty of the identified HCP.

16. The unique HCP user identity system of claim 15, further comprising identified HCP browser attributes deterministic signals include subscriptions/associations, HCP consent, demographic signals, age, gender, and geographical location.

17. The unique HCP user identity system of claim 15, further comprising identified HCP browser attributes probabilistic signals including browsing history, visit frequency, and search keywords.

18. The unique HCP user identity system of claim 15, further comprising the end user HCP collected data includes browser attributes including the name of the browser, operating system OS used by the device, device brand, device model version, and session timestamp.

19. The unique HCP user identity system of claim 15, further comprising the identity solution combines all identity signals for an HCP including deterministic persistent data and probabilistic non-persistent data.

20. The unique HCP user identity system of claim 15, further comprising HCP UUID identified data provides a competitive advantage in healthcare-related ad tech targeting that benefits multiple advertiser partners.

* * * * *